United States Patent
Wang

(10) Patent No.: US 9,632,623 B2
(45) Date of Patent: Apr. 25, 2017

(54) PROCESSING METHOD FOR TOUCH OPERATION AND TERMINAL

(71) Applicant: Huawei Device Co., Ltd., Shenzhen (CN)

(72) Inventor: Shuoxing Wang, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 11 days.

(21) Appl. No.: 14/143,786

(22) Filed: Dec. 30, 2013

(65) Prior Publication Data

US 2014/0111487 A1 Apr. 24, 2014

Related U.S. Application Data

(63) Continuation of application No. PCT/CN2013/071698, filed on Feb. 20, 2013.

(30) Foreign Application Priority Data

Feb. 22, 2012 (CN) .......................... 2012 1 0040529

(51) Int. Cl.
  *G06F 3/041* (2006.01)
  *G06F 3/0488* (2013.01)

(52) U.S. Cl.
  CPC ........ *G06F 3/0418* (2013.01); *G06F 3/04886* (2013.01)

(58) Field of Classification Search
  CPC .................................. G06F 3/041; G06F 3/043
  See application file for complete search history.

(56) References Cited

U.S. PATENT DOCUMENTS

| | | | |
|---|---|---|---|
| 2007/0247442 A1* | 10/2007 | Andre | ..................... G06F 3/041 345/173 |
| 2008/0098331 A1 | 4/2008 | Novick et al. | |
| 2009/0251422 A1 | 10/2009 | Wu et al. | |
| 2010/0302211 A1 | 12/2010 | Huang | |
| 2012/0013645 A1* | 1/2012 | Hu | ....................... G06F 3/04886 345/667 |
| 2013/0201118 A1 | 8/2013 | Liu | |

FOREIGN PATENT DOCUMENTS

| CN | 101446872 A | 6/2009 |
|---|---|---|
| CN | 101644978 A | 2/2010 |
| CN | 102053754 A | 5/2011 |
| CN | 102117140 A | 7/2011 |

* cited by examiner

*Primary Examiner* — Tony N Ngo
(74) *Attorney, Agent, or Firm* — Slater Matsil, LLP

(57) ABSTRACT

Embodiments of the present invention disclose a processing method for a touch operation and a terminal. The method in the embodiments of the present invention includes: receiving a touch operation of a user, and determining coordinates of a touch point; calculating, when the coordinates of the touch point do not locate in the touch region of touch objects, a distance between the touch point and a touch region of each of the touch objects according to the coordinates of the touch point; and selecting the touch object corresponding to the minimum value among the distances as a touch operation object. By implementing the solutions of the present invention, ineffective touch operations may be prevented, a touch success rate may be increased, and accordingly touch operation experience of the user is improved.

12 Claims, 4 Drawing Sheets

PROCESSING METHOD FOR TOUCH OPERATION AND TERMINAL

This application is a continuation of International Application No. PCT/CN2013/071698, filed on Feb. 20, 2013, which claims priority to Chinese Patent Application No. 201210040529.7, filed on Feb. 22, 2012, both of which are hereby incorporated by reference in their entireties.

TECHNICAL FIELD

The present invention relates to the field of terminal technologies, and in particular, to a processing method for a touch operation and a terminal.

BACKGROUND

A touch terminal receives a touch operation instruction on the terminal from a user by adopting a touchscreen. For example, to start an application or to start a function, a user only needs to touch an icon or a text identifier corresponding to the application or function in a display interface to send to the terminal a touch operation instruction for starting the application or function. The icon or text identifier of the application or function is called a touch object. A touch operation manner imitates an operation manner of a physical key and is characterized by simple, visual, and convenient operations. Therefore, the touch operation manner greatly improves human computer interaction experience on the terminal for a user.

Currently, a terminal performs operations and processing on whether a touch object in a display interface is touched by using the following method. Referring to FIG. 1, for example, the display interface contains only one touch object, that is, the touch object 102, and all points in the entire display interface 101 may be represented by using a plane x-y coordinate system. The axis x is the horizontal axis, whereas the axis y is the vertical axis. The touch region of the touch object 102 is a rectangle. The position of the rectangle is determined by the two points (px1, py1) and (px2, py2) on a diagonal. If a touch point (px, py) falls in the rectangle, that is, both px1<px<px2 and py1<py<py2 are met, it is determined that the touch object 102 is touched, and the application or function corresponding to the touch object 102 is started subsequently.

However, errors often occur in touch operations of a user, and sometimes it is difficult to completely control a touch point to strictly fall in the touch region corresponding to the touch object to be started. In particular, when several touch objects are arranged in a display interface, a touch point of a user often falls in a common display interface region, and such a region does not belong to a touch region of touch objects, causing several times of ineffective touch operations, which degrades touch operation experience of a user.

SUMMARY OF THE INVENTION

To solve the problem of an ineffective touch operation, embodiments of the present invention provide a method and terminal for processing a touch operation to determine a touch object that a user is to touch when the coordinates of a touch point of the user do not locate in a touch region of touch objects, thereby preventing ineffective touch operations, increasing a touch success rate, and accordingly improving touch operation experience of a user.

A method embodiment for processing a touch operation includes receiving a touch operation of a user and determining coordinates of a touch point, calculating, when the coordinates of the touch point do not locate in a touch region of touch objects, a distance between the touch point and a touch region of each of the touch objects according to the coordinates of the touch point, and selecting a touch object corresponding to the minimum value among the distances as a touch operation object.

A terminal embodiment includes a touch point coordinate determination unit configured to receive a touch operation of a user and determine coordinates of a touch point, a distance calculation unit configured to calculate, when the coordinates of the touch point do not locate in a touch region of touch objects, a distance between the touch point and a touch region of each of the touch objects according to the coordinates of the touch point, and a first touch operation object selection unit configured to select a touch object corresponding to the minimum value among the distances as a touch operation object.

As can be seen from the foregoing technical solutions, embodiments of the present invention have the following advantages. When the coordinates of a touch point of a user do not locate in a touch region of touch objects, a distance between the touch point and a touch region of each of the touch objects is calculated according to the coordinates of the touch point, and the touch object corresponding to the minimum value among the distances is selected as a touch operation object, thereby preventing ineffective touch operations, increasing a touch success rate, and accordingly improving touch operation experience of a user.

DETAILED DESCRIPTION OF ILLUSTRATIVE EMBODIMENTS

Embodiments of the present invention provide a method for processing a touch operation, to determine a touch object that a user is to touch when coordinates of a touch point of the user do not locate in a touch region of touch objects, thereby preventing ineffective touch operations and improving touch operation experience of a user. The embodiments of the present invention further provide a terminal related to the method. The method and the terminal are described in detail in the following.

Figure 1:
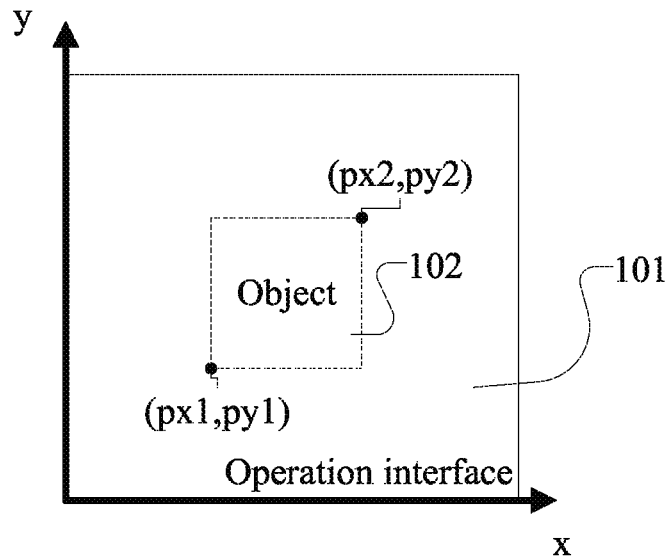
FIG. 1 is a schematic diagram of touch operation processing in the prior art.
Figure 2:
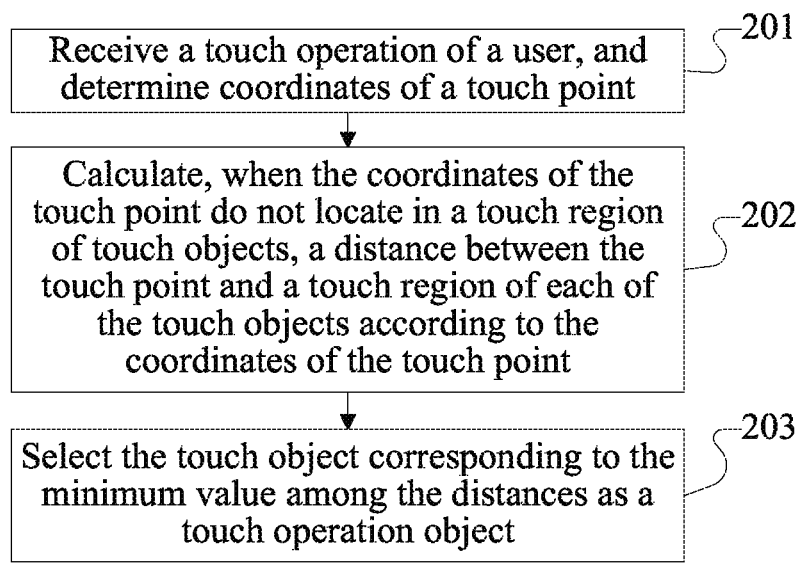
FIG. 2 is a flow chart of a method for processing a touch operation according to an embodiment of the present invention.

One embodiment of the present invention describes a method for processing a touch operation. FIG. 2 is a flow chart of a method for processing the touch operation, where the method includes the following steps.

201. Receive a touch operation of a user, and determine coordinates of a touch point. To start an application or start a function, a user performs a touch operation, and only needs to touch a touch object corresponding to the application or function in a display interface to send, to a terminal, a touch operation instruction for starting the application or function.

When a user performs a touch operation, the point where the display interface is touched is called a touch point. In this step, determining coordinates of a touch point is obtaining a coordinate position of the touch point on a screen.

202. Calculate, when the coordinates of the touch point do not locate in a touch region of touch objects, a distance between the touch point and a touch region of each of the touch objects according to the coordinates of the touch point. The touch object is a selectable object in the current display interface, and may be any selectable object such as an icon or a text identifier on the screen, which is not limited in the embodiments of the present invention. The touch region is the effective sensing region of a corresponding touch object in the display interface. In the display interface of the terminal, touch objects are arranged in a grid manner. A touch region is usually a rectangle and contains a corresponding touch object. According to the prior art, the area of the touch region may be the same as that of the touch object, or may be larger than that of the touch object, which is not limited in the embodiments of the present invention. A touch point does not need to hit a touch object. As long as a touch point locates in the touch region of a touch object, the touch object can be selected as a touch operation object. In addition, any two touch regions do not overlap, thereby ensuring the uniqueness and precision of a touch operation.

When the coordinates of the touch point do not locate in a touch region of touch objects, the touch operation is ineffective. In that case, according to the method provided in the embodiment of the present invention, in this step, a distance between the touch point and a touch region of each of the touch objects is calculated according to the coordinates of the touch point.

There may be many methods for calculating a distance between the touch point and a touch region of each of the touch objects. For example, the distance between the touch point and the intersection of diagonals of the touch region is calculated. Alternatively, according to the definition of plane geometry, the distance from a point to a graphic is the shortest radius of a circle that is drawn with the point as the center and is tangent to the graphic, which is not limited in the embodiments of the present invention.

203. Select a touch object corresponding to the minimum value among the distances as a touch operation object. The touch object corresponding to the minimum value among the distances calculated in step 202 is selected as the touch operation object. Optionally, after the touch operation object is determined, a processor of the terminal performs a corresponding operation according to the instruction corresponding to the touch operation object.

In this embodiment, when the coordinates of a touch point of a user do not locate in a touch region of touch objects, a distance between the touch point and a touch region of each of the touch objects is calculated according to the coordinates of the touch point, and a touch object corresponding to the minimum value among the distances is selected as the touch operation object, thereby preventing ineffective touch operations, increasing a touch success rate, and accordingly improving touch operation experience of a user.

Figure 3:
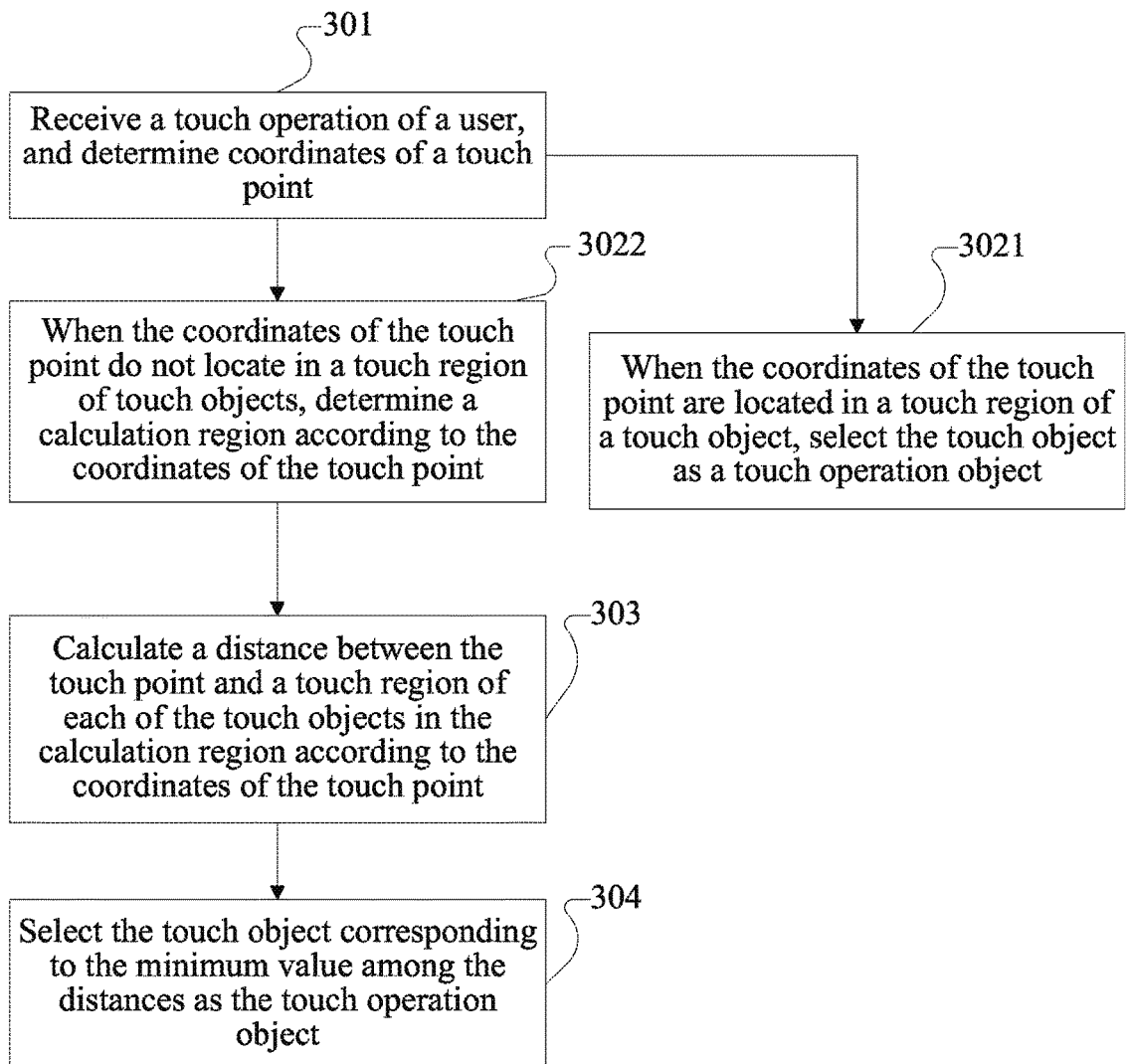
FIG. 3 is a flow chart of a method for processing a touch operation according to another embodiment of the present invention.

FIG. 3 is a flow chart of another embodiment of a method for processing a touch operation, where the process includes the following steps.

301. Receive a touch operation of a user, and determine coordinates of a touch point. To start an application or start a function, a user performs a touch operation, and only needs to touch a touch object corresponding to the application or function in a display interface to send, to a terminal, a touch operation instruction for starting the application or function.

Figure 4:
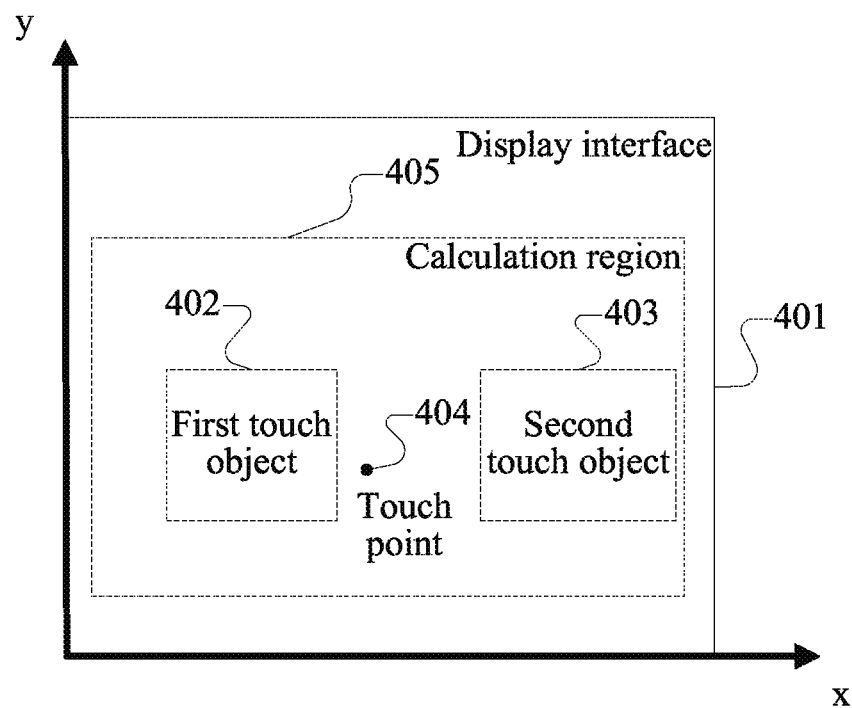
FIG. 4 is a schematic diagram of touch operation processing according to an embodiment of the present invention.

When a user performs a touch operation, the point where the display interface is touched is called a touch point. In this step, the coordinate position of the touch point is obtained. Referring to FIG. 4, for example, when a display interface 401 contains two touch objects, the touch objects are a first touch object 402 and a second touch object 403, and the point where the display interface 401 is touched by a user is a touch point 404. In this step, the coordinates of the touch point 404 are obtained.

3021. When the coordinates of the touch point locate in the touch region of a touch object, select the touch object as a touch operation object. The touch object is a selectable object in the current display interface, and may be any selectable object such as an icon or a text identifier on the screen, which is not limited in the embodiments of the present invention. The touch region is an effective region of the corresponding touch object in the display interface. In the display interface of the terminal, touch objects are arranged in a grid manner. A touch region is usually a rectangle and contains a corresponding touch object. According to the prior art, the area of the touch region may be the same as that of the touch object, or may be larger than that of the touch object, which is not limited in the embodiments of the present invention. A touch point does not need to hit a touch object. As long as a touch point locates in the touch region of a touch object, the touch object can be selected as a touch operation object. In addition, any two touch regions do not overlap, thereby ensuring the uniqueness of a touch operation.

Referring to FIG. 4, according to an solution in the prior art, when the coordinates of the touch point 404 locate in the touch region of the first touch object 402 or the second touch object 403, the touch object corresponding to the touch region is selected as the touch operation object.

3022. When the coordinates of the touch point do not locate in a touch region of touch objects, determine a calculation region according to the coordinates of the touch point. It should be noted that, this step is an optimized optional step and is not essential. The calculation region is a region in the display interface determined in advance according to the touch point. A touch point of an ineffective touch operation is not very far away from a touch object, and therefore the configuration of a calculation region may make that only a distance between the touch point and a touch region of a touch object in the calculation region is calculated in a subsequent step, thereby reducing the work load of calculation.

There may be many methods for determining the calculation region according to the touch point. For example, the touch point may be considered as a geometrical center, and a circular region is calculated by using a preset diameter, or a rectangular region is calculated by using a preset side length. Also, the display interface may be divided in advance into several small regions same in shape and area, and the touch point falls in a small region. Only an example is provided for a preset region for determination here and no specific limitation is made.

In FIG. 4, when the coordinates of the touch point 404 do not locate in a touch region of touch objects, the touch operation is ineffective. Therefore, in this step, a calculation region 405 is determined according to the coordinates of the touch point 404. It should be noted that, the region 405 in FIG. 4 is only an example. Two touch objects 402 and 403 are arranged in the calculation region 405. It is assumed that, when either touch object is a target touch object that a user wants to start, for example, the first touch object 402, a non-target touch object is also arranged in the calculation region, that is, the second touch object 403.

303. Calculate a distance between the touch point and a touch region of each of the touch objects in the calculation region according to the coordinates of the touch point. For example, it is mentioned in the background that the touch region of a touch object may be a rectangle, and the rectangle may be determined by two points on one diagonal. Therefore, referring to FIG. 4, the touch regions of the first touch object 402 and the second touch region 403 are determined by the coordinates of the two points on their respective diagonals.

In this step, the distance between the touch point and the touch region of each of the touch objects is calculated according to the coordinates of the touch point. As discussed above, there may be many methods for calculating the distance between the touch point and a touch region of each of the touch objects. In this embodiment, one example is provided. According to the definition of plane geometry, the distance from a point to a graphic is the shortest radius of a circle that is drawn with the point as the center and is tangent to the graphic. All touch regions are rectangles. Therefore, an algorithm for calculating the distance adopted in this step is as follows.

Figure 5:
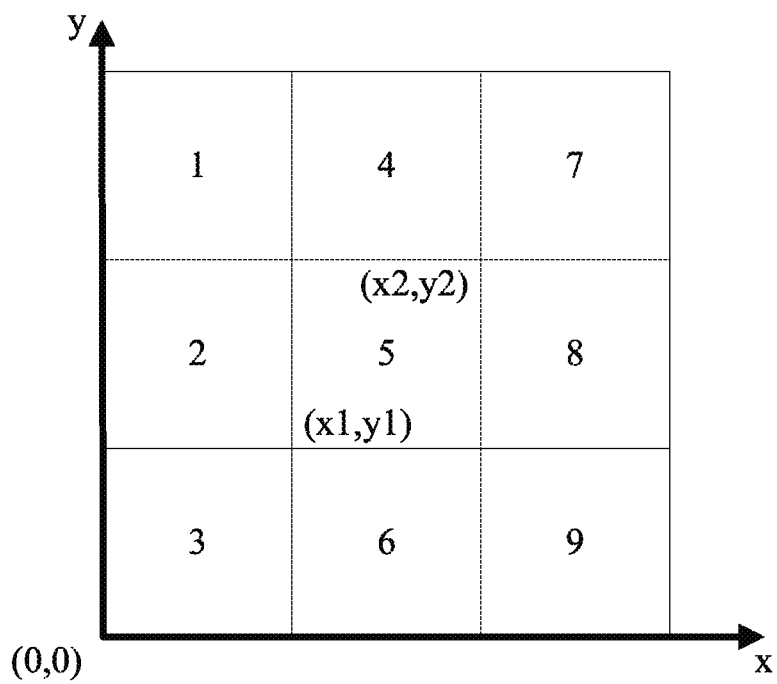
FIG. 5 is a schematic diagram of an algorithm according to an embodiment of the present invention.

Referring to FIG. 5, nine regions in total are obtained through division. It is assumed that the region 5 is the touch region of a touch object, and the other eight regions are common display interface regions, that is, the touch operation is ineffective when a touch point locates in the eight regions. The region 5 is determined by two points on the diagonal, which are (x1, y1) and (x2, y2), and x1<x2 and y1<y2. It is assumed that the coordinates of the touch point are (x, y), and the distance is D.

If a touch point falls in the region 3, that is, x<x1 and y<y1, the distance D is the distance from (x, y) to (x1, y1), that is, the distance $D=\sqrt{(x1-x)^2+(y1-y)^2}$.

If a touch point falls in the region 2, that is, x<x1 and y1<y<y2, the distance D=x1-x.

If a touch point falls in the region 1, that is, x<x1 and y>y2, the distance D is the distance from (x, y) to (x1, y2), that is, the distance $D=\sqrt{(x1-x)^2+(y-y2)^2}$.

If a touch point falls in the region 6, that is, x1<x<x2 and y<y1, the distance D=y1-y.

If a touch point falls in the region 4, that is, x1<x<x2 and y<y2, the distance D=y-y2.

If a touch point falls in the region 9, that is, x<x2 and y<y1, the distance D is the distance from (x, y) to (x2, y1), that is, the distance $D=\sqrt{(x-x2)^2+(y1-y)^2}$.

If a touch point falls in the region 8, that is, x>x2 and y1<y<y2, the distance D=x-x2.

If a touch point falls in the region 7, that is, x>x2 and y>y2, the distance D is the distance from (x, y) to (x2, y2), that is, the distance $D=\sqrt{(x-x2)^2+(y-y2)^2}$.

In step 3021, when the coordinates of the touch point locate in the touch region of a touch object, the touch object is selected as the touch operation object, and the foregoing algorithm may also be used for calculation. If the touch point falls in the region 5, that is, x1<x<x2 and y1<y<y2, the distance D=0, and the distance is the minimum value, which indicates that an object corresponding to the region 5 is the touch operation object.

Referring to FIG. 4, by using the foregoing algorithm corresponding to FIG. 5, the distances between the touch point 404 and the touch regions of the first touch object 402 and the second touch region 403 in the calculation region 405 may be calculated. It is assumed that it is calculated that the distance between the touch point 404 and the touch region of the first touch object 402 calculated is D1, and the distance between the touch point 404 and the touch region of the first touch object 403 is D2.

304. Select the touch object corresponding to the minimum value among the distances as a touch operation object. The touch object corresponding to the minimum value among the distances calculated in step 303 is selected as the touch operation object. Optionally, after the touch operation object is determined, a processor of the terminal performs a corresponding operation according to the instruction corresponding to the touch operation object.

In this embodiment, when the coordinates of a touch point locate in the touch region of a touch object, the touch object is selected as a touch operation object; when the coordinates of a touch point do not locate in a touch region of touch objects, a calculation region is determined according to the touch point, and a distance between the touch point and a touch region of each of the touch objects is calculated according to the coordinates of the touch point; a touch object corresponding to the minimum value among the distances is selected as a touch operation object, thereby preventing ineffective touch operations, increasing a touch success rate, and accordingly improving touch operation experience of a user.

Figure 6:
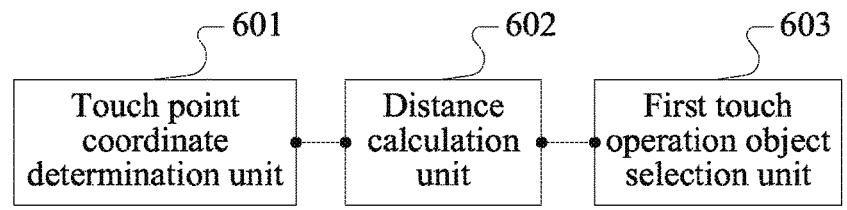
FIG. 6 is a structural diagram of a terminal according to an embodiment of the present invention.

One embodiment of a terminal related to the embodiment of FIG. 2 is described in detail in FIG. 6. The terminal includes: a touch point coordinate determination unit 601, a distance calculation unit 602, and a first touch operation object selection unit 603.

The touch point coordinate determination unit 601 is configured to receive a touch operation of a user and determine coordinates of a touch point. To start an application or start a function, a user performs a touch operation, and only needs to touch a touch object corresponding to the application or function in a display interface to send to the terminal a touch operation instruction for starting the application or function. When a user performs a touch operation, the point where the display interface is touched is called a touch point, and the touch point coordinate determination unit 601 obtains the coordinates of the touch point.

The distance calculation unit 602 is configured to calculate, when the coordinates of the touch point do not locate in a touch region of touch objects, a distance between the touch point and a touch region of each of the touch objects according to the coordinates of the touch point. The touch object is a selectable object in the current display interface, and may be any selectable object such as an icon or a text identifier on the screen, which is not limited in the embodiments of the present invention.

The touch region is an effective sensing region of the corresponding touch object in the display interface. In the display interface of the terminal, touch objects are arranged in a grid manner. A touch region is usually a rectangle and contains a corresponding touch object. According to the prior art, the area of the touch region may be the same as that of the touch object, or may be larger than that of the touch object, which is not limited in the embodiments of the present invention. A touch point does not need to hit a touch object. As long as a touch point locates in the touch region of a touch object, the touch object can be selected as a touch operation object. In addition, any two touch regions do not overlap, thereby ensuring the uniqueness and precision of a touch operation.

When the coordinates of the touch point do not locate in a touch region of touch objects, the touch operation is ineffective. In that case, according to the method provided by the embodiments of the present invention, the distance calculation unit 602 calculates the distance between the touch point and a touch region of each of the touch objects according to the coordinates of the touch point obtained by the touch point coordinate determination unit 601.

There may be many methods for calculating a distance between the touch point and a touch region of each of the touch objects. For example, the distance between the touch point and the intersection of diagonals of the touch region is calculated. Alternatively, according to the definition of plane geometry, the distance from a point to a graphic is the shortest radius of a circle that is drawn with the point as the center and is tangent to the graphic, which is not limited in the embodiments of the present invention.

The first touch operation object selection unit 603 is configured to select a touch object corresponding to the minimum value among the distances as a touch operation object. The first touch operation object selection unit 603 selects the touch object corresponding to the minimum value among the distances calculated by the distance calculation unit 602 as the touch operation object. Optionally, after the touch operation object is determined, a processor of the terminal performs a corresponding operation according to the instruction corresponding to the touch operation object. Referring to FIG. 5, for example, D1 is smaller than D2 and is the minimum distance. In that case, the first touch object 402 is selected as the touch operation object.

In this embodiment, when the coordinates of the touch point of the user do not locate in a touch region of touch objects, the distance calculation unit 602 calculates the distance between the touch point and a touch region of each of the touch objects according to the coordinates of the touch point, and the first touch operation object selection unit 603 selects the touch object corresponding to the minimum value among the distances as the touch operation object, thereby preventing ineffective touch operations, increasing a touch success rate, and accordingly improving touch operation experience of a user.

Figure 7:
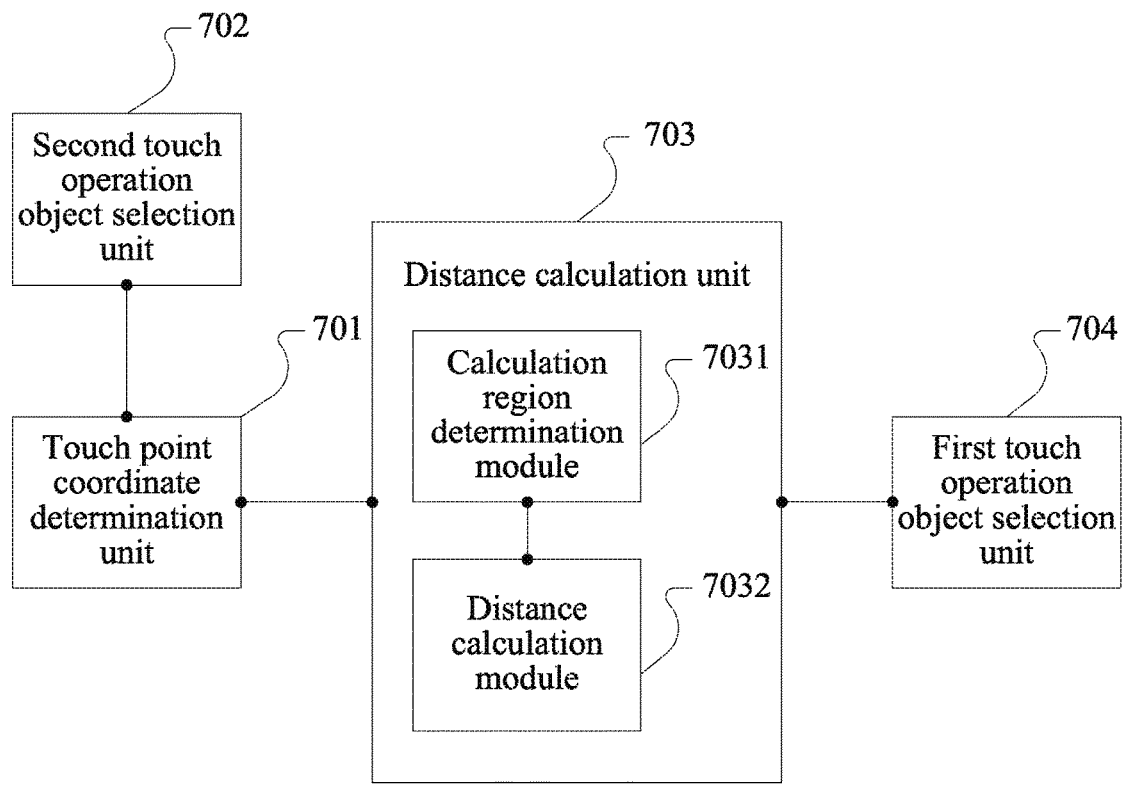
FIG. 7 is a structural diagram of a terminal according to an embodiment of the present invention.

The terminal embodiment of FIG. 6 is further described in FIG. 7. FIG. 7 is a structural diagram of the terminal, where the terminal includes: a touch point coordinate determination unit 701, a second touch operation object selection unit 702 and a distance calculation unit 703.

The touch point coordinate determination unit 701 is configured to receive a touch operation of a user and determine coordinates of a touch point. To start an application or start a function, a user performs a touch operation, and only needs to touch a touch object corresponding to the application or function in a display interface to send to the terminal a touch operation instruction for starting the application or function. When a user performs a touch operation, a point where the display interface is touched is called a touch point, and the touch point coordinate determination unit 701 obtains the coordinates of the touch point. Referring to FIG. 4, for example, a display interface 401 contains two touch objects, the touch objects are a first touch object 402 and a second touch object 403, the point where the display interface 401 is touched by the user is a touch point 404, and the touch point coordinate determination unit 701 obtains the coordinates of the touch point 404.

The second touch operation object selection unit 702 is configured to select, when the coordinates of a touch point locate in the touch region of a touch object, the touch object as a touch operation object.

The touch object is a selectable object in the current display interface, and may be any selectable object such as an icon or a text identifier on the screen, which is not limited in the embodiments of the present invention. A touch region is an effective region of the corresponding touch object in the display interface. In the display interface of the terminal, touch objects are arranged in a grid manner. A touch region is usually a rectangle and contains a corresponding touch object. According to the prior art, the area of the touch region may be the same as that of the touch object, or may be larger than that of the touch object, which is not limited in the embodiments of the present invention. A touch point does not need to hit a touch object. As long as a touch point locates in the touch region of a touch object, the touch object can be selected as a touch operation object. In addition, any two touch regions do not overlap, thereby ensuring the uniqueness of a touch operation.

Referring to FIG. 4, according to an solution in the prior art, when the coordinates of the touch point 404 locate in the touch region of the first touch object 402 or the second touch object 403, the second touch operation object selection unit 702 selects the touch object corresponding to the touch region as the touch operation object.

The distance calculation unit 703 is configured to calculate, when the coordinates of the touch point do not locate in a touch region of touch objects, a distance between the touch point and a touch region of each of the touch objects according to the coordinates of the touch point. The distance calculation unit 703 further includes a calculation region determination module 7031 and a distance calculation module 7032.

The calculation region determination module 7031 is configured to determine, when the coordinates of the touch point do not locate in any touch region of the touch object, a calculation region according to the coordinates of the touch point. Note that this unit is an optimized optional unit.

The calculation region is a region in the display interface determined in advance according to the touch point. A touch point of an ineffective touch operation is not very far away from a touch object, and therefore the configuration of a calculation region may make that only a distance between the touch point and a touch region of a touch object in the calculation region is calculated in a subsequent step, thereby reducing the work load of calculation.

There may be many methods for determining the calculation region according to the touch point. For example, the touch point may be considered as a geometrical center, and a circular region is calculated by using a preset diameter, or a rectangular region is calculated by using a preset side length. Also, the display interface may be divided in advance into small regions same in shape and area, and the touch point falls in a small region. Only an example is provided for a preset region for determination here and no specific limitation is made.

In FIG. 4, when the coordinates of the touch point 404 do not locate in a touch region of touch objects, the touch operation is ineffective. Therefore, the calculation region determination module 7031 determines a calculation region 405 according to the coordinates of the touch point 404. It should be noted that the region 405 in FIG. 4 is only an example. Two touch objects 402 and 403 are arranged in the calculation region 405. It is assumed that, when either touch object is a target touch object that a user wants to start, for example, the first touch object 402, and a non-target touch object is also arranged in the calculation region, that is, the second touch object 403.

The distance calculation module 7032 is configured to calculate the distance between the touch point and a touch region of each of the touch objects in the calculation region according to the coordinates of the touch point.

For example, it is mentioned in the background that the touch region of the touch object may be a rectangle, and the rectangle may be determined by two points on a diagonal. Therefore, referring to FIG. 4, the touch regions of the first touch object 402 and the second touch region 403 are determined by the coordinates of the two points on their respective diagonals.

The distance calculation module 7032 calculates the distance between the touch point and a touch region of each of the touch objects according to the coordinates of the touch point.

As discussed above, there may be many methods for calculating the distance between the touch point and a touch region of each of the touch objects. In this embodiment, one example is provided. According to the definition of plane geometry, the distance from a point to a graphic is the shortest radius of a circle that is drawn with the point as the center and is tangent to the graphic. All touch regions are rectangles. Therefore, an algorithm for calculating the distance adopted in this step is as follows.

Referring to FIG. 5, nine regions in total are obtained through division. It is assumed that the region 5 is the touch region of a touch object, and the other eight regions are common display interface regions, that is, the touch operation is ineffective when a touch point locates in the eight regions. The region 5 is determined by two points on the diagonal, which are (x1, y1) and (x2, y2), and x1<x2 and y1<y2. It is assumed that the coordinates of the touch point are (x, y), and the distance is D.

If a touch point falls in the region 3, that is, x<x1 and y<y1, the distance D is the distance from (x, y) to (x1, y1), that is, the distance $D=\sqrt{(x1-x)^2+(y1-y)^2}$.

If a touch point falls in the region 2, that is, x<x1 and y1<y<y2, the distance D=x1−x.

If a touch point falls in the region 1, that is, x<x1 and y<y2, the distance D is the distance from (x, y) to (x1, y2), that is, the distance $D=\sqrt{(x1-x)^2+(y-y2)^2}$.

If a touch point falls in the region 6, that is, x1<x<x2 and y<y1, the distance D=y1−y.

If a touch point falls in the region 4, that is, x1<x<x2 and y>y2, the distance D=y−y2.

If a touch point falls in the region 9, that is, x>x2 and y<y1, the distance D is the distance from (x, y) to (x2, y1), that is, the distance $D=\sqrt{(x-x2)^2+(y1-y)^2}$.

If a touch point falls in the region 8, that is, x>x2 and y1<y<y2, the distance D=x−x2.

If a touch point falls in the region 7, that is, x>x2 and y>y2, the distance D is the distance from (x, y) to (x2, y2), that is, the distance $D=\sqrt{(x-x2)^2+(y-y2)^2}$.

The function of the second touch operation object selection unit 702 may also be implemented by the foregoing algorithm. If a touch point falls in the region 5, that is, x1<x<x2 and y1<y<y2, the distance D=0, and the distance is the minimum value, which indicates that an object corresponding to the region 5 is the touch operation object.

Referring to FIG. 4, using the foregoing algorithm corresponding to FIG. 5, the distance calculation module 7032 may calculate the distances between the touch point 404 and the touch regions of the first touch object 402 and the second touch region 403 in the calculation region 405. It is assumed that it is calculated that the distance between the touch point 404 and the touch region of the first touch object 402 is D1, and the distance between the touch point 404 and the touch region of the first touch object 403 is D2.

A first touch operation object selection unit 704 is configured to select a touch object corresponding to the minimum value among the distances as a touch operation object.

The first touch operation object selection unit 704 selects the touch object corresponding to the minimum value among the distances calculated by the distance calculation module 7032 as the touch operation object. Optionally, after the touch operation object is determined, a processor of the terminal performs a corresponding operation according to the instruction corresponding to the touch operation object. Referring to FIG. 5, it is assumed that, D1 is smaller than D2, and is the minimum distance. At this time, the first touch object 402 is selected as the touch operation object.

In this embodiment, when the coordinates of the touch point locate in the touch region of a touch object, the second touch operation object selection unit 702 selects the touch object as the touch operation object; when the coordinates of the touch point do not locate in a touch region of touch objects, the calculation region determination module 7031 determines the calculation region according to the touch point, and the distance calculation module 7032 calculates the distance between the touch point and a touch region of each of the touch objects according to the coordinates of the touch point; and the first touch operation object selection unit 704 selects the touch object corresponding to the minimum value among the distances as the touch operation object, thereby preventing ineffective touch operations, increasing a touch success rate, and accordingly improving touch operation experience of a user.

Optionally, the terminal may be a mobile terminal such as a mobile phone or a tablet computer. When the terminal is the mobile terminal, the units in the embodiments of FIG. 6 and FIG. 7 may be implemented through hardware, and may also be implemented through running a software program by a processor of the terminal.

In addition, a person of ordinary skill in the art may understand that all or a part of the processes of the foregoing method embodiments may be implemented by a program instructing relevant hardware. The foregoing program may be stored in a computer readable storage medium. The foregoing storage medium may be a read-only memory (ROM), a random access memory (RAM), a magnetic disk, or an optical disc.

The foregoing describes in detail a processing method for a touch operation and relevant mobile devices provided in the present invention. A person of ordinary skill in the art can make variations to the present invention in terms of the specific implementations and application scopes according to the ideas of the present invention. Therefore, the specification shall not be construed as a limit to the present invention.

What is claimed is:
1. A method of processing a touch operation, comprising:
receiving a touch operation of a user, and determining coordinates of a touch point;
selecting a touch object of touch objects as a touch operation object in response to the touch operation of the user and further in response to the coordinates of the touch point being located in a touch region corresponding to the touch object;

determining a calculation region according to the coordinates of the touch point in response to the coordinates of the touch point not being located in a touch region of the touch objects, wherein a display interface is divided into a plurality of regions having a same shape and size, and wherein the determining the calculation region comprises selecting the region of the plurality of regions where the touch point falls as the calculation region;

calculating, in response to the coordinates of the touch point not being located in a touch region of the touch objects, a distance between the touch point and a touch region of each of the touch objects in the calculation region according to the coordinates of the touch point and without calculating a distance to at least one touch region outside of the calculation region, wherein the touch region of each of the touch objects is a region larger than the respective touch object and that extends in two dimensions and is bounded by a border, wherein the border of each touch region is spaced apart from the border of each adjacent touch region, and wherein the distance between the touch point and the respective touch region of each of the touch objects is a shortest straight line distance to a nearest point on the border of the respective touch region; and selecting, as a touch operation object, a touch object corresponding to the minimum value among the distances in response to the coordinates of the touch point not being located in a touch region of the touch objects.

2. The method according to claim 1, wherein the calculation region is smaller than a display interface.

3. The method according to claim 2, wherein the method further comprises: selecting a touch object as the touch operation object after the determining coordinates of the touch point and when the coordinates of the touch point locate in the touch region of the touch object.

4. The method according to claim 1, wherein the calculation region is rectangular and larger than each of the touch regions.

5. A terminal, comprising:
a touchscreen;
a touch point coordinate determination unit configured to receive a touch operation of a user on the touchscreen, and to determine coordinates of a touch point on the touch screen;
a second touch operation object selection unit configured to select a touch object of touch objects as a touch operation object in response to the receiving the touch operation of the user and further in response to the coordinates of the touch point being located in a touch region corresponding to the touch object;
a calculation region determination module configured to determine a calculation region according to the coordinates of the touch point in response to the coordinates of the touch point not being located in a touch region of the touch objects, the calculation region having a preset dimension;
a distance calculation unit configured to calculate, in response to the coordinates of the touch point not being located in a touch region of the touch objects in the calculation region, a distance between the touch point and a touch region of each of the touch objects according to the coordinates of the touch point and without calculating a distance to at least one touch region outside of the calculation region, wherein the touch region of each of the touch objects is a region larger than the respective touch object and that extends in two dimensions of the touchscreen, wherein the touch region of each of the touch objects is bounded by a respective border, wherein the border of each touch region is spaced apart from the border of each adjacent touch region, and wherein the distance between the touch point and the respective touch region of each of the touch objects is a shortest straight line distance to a nearest point on the border of the respective touch region; and a first touch operation object selection unit configured to select a touch object corresponding to the minimum value among the distances as a touch operation object in response to the coordinates of the touch point not being located in a touch region of the touch objects.

6. The terminal according to claim 5, wherein the calculation region is smaller than a display interface of the touchscreen.

7. The terminal according to claim 6, further comprising a second touch operation object selection unit configured to select a touch object as the touch operation object when the coordinates of the touch point locate in the touch region of the touch object.

8. The terminal according to claim 5, wherein the calculation region is rectangular and larger than each of the touch regions, and wherein the preset dimension is a preset side length of a side of the calculation region.

9. A terminal, comprising:
a touchscreen;
a processor connected to the touchscreen; and
a non-transitory computer readable medium connected to the processor and having stored thereon instructions that, when executed, cause the processor to:
receive a touch operation of a user on the touchscreen, and to determine coordinates of a touch point on the touchscreen;
select a touch object of touch objects as a touch operation object in response to the touch operation of the user and further in response to the coordinates of the touch point being located in a touch region corresponding to the touch object;
determine a calculation region according to the coordinates of the touch point in response to the coordinates of the touch point not being located in a touch region of the touch objects, the calculation region having a preset dimension, wherein a display interface is divided into a plurality of regions having a same shape and size, and wherein the calculation region is a region of the plurality of regions where the touch point falls; and
calculate, in response to the coordinates of the touch point not being located in a touch region of the touch objects, a distance between the touch point and a touch region of each of the touch objects in the calculation region according to the coordinates of the touch point and without calculating a distance to at least one touch region outside of the calculation region, wherein the touch region of each of the touch objects is a region larger than the respective touch object and that extends in two dimensions of the touchscreen, wherein the touch region of each of the touch objects is bounded by a respective border, wherein the border of each touch region is spaced a part from the border of each adjacent touch region, and wherein the distance between the touch point and the respective touch region of each of the touch objects is a shortest straight line distance to a nearest point on the border of the respective touch region; and select a touch object corresponding to the minimum value among the distances as a touch operation object in response to the coordinates of the touch point not being located in a touch region of the touch objects.

10. The terminal according to claim 9, wherein the calculation region is smaller than a display interface of the touchscreen.

11. The terminal according to claim 10, wherein the non-transitory computer readable medium further has stored thereon instructions that, when executed, cause the processor to:

select a touch object as the touch operation object when the coordinates of the touch point locate in the touch region of the touch object.

12. The terminal according to claim 9, wherein the calculation region is rectangular and larger than each of the touch regions, and wherein the preset dimension is a preset side length of a side of the calculation region.

\* \* \* \* \*